United States Patent
Sultan et al.

(10) Patent No.: US 7,102,997 B2
(45) Date of Patent: Sep. 5, 2006

(54) AGGREGATE RATE TRANSPARENT LAN SERVICE FOR CLOSED USER GROUPS OVER OPTICAL RINGS

(75) Inventors: Robert Sultan, Katonah, NY (US);
Ajay Sahai, Shrewsbury, MA (US);
Sushil Pandhi, Mahwah, NJ (US);
Zubao Yang, Maywood, NJ (US)

(73) Assignee: Fujitsu Limited, Kanagawa-ken (JP)

( * ) Notice: Subject to any disclaimer, the term of this patent is extended or adjusted under 35 U.S.C. 154(b) by 977 days.

(21) Appl. No.: 10/090,461

(22) Filed: Mar. 4, 2002

(65) Prior Publication Data

US 2003/0165146 A1   Sep. 4, 2003

(51) Int. Cl.
*H04L 12/26* (2006.01)
(52) U.S. Cl. ...................................... 370/233; 370/235
(58) Field of Classification Search ........ 370/229–230, 370/234–235.1, 233
See application file for complete search history.

(56) References Cited

U.S. PATENT DOCUMENTS

| | | | | |
|---|---|---|---|---|
| 5,014,265 A | * | 5/1991 | Hahne et al. ............... | 370/236 |
| 5,418,777 A | * | 5/1995 | Worster ...................... | 370/238 |
| 5,426,640 A | * | 6/1995 | Hluchyj et al. ............. | 370/235 |
| 5,889,762 A | * | 3/1999 | Pajuvirta et al. ............ | 370/230 |
| 5,914,945 A | * | 6/1999 | Abu-Amara et al. ........ | 370/329 |
| 5,959,973 A | | 9/1999 | Meurisse et al. ............ | 370/232 |
| 6,081,524 A | | 6/2000 | Chase et al. ................ | 370/389 |
| 6,085,241 A | | 7/2000 | Otis ............................ | 709/223 |
| 6,108,736 A | | 8/2000 | Bell ............................ | 710/107 |
| 6,118,761 A | * | 9/2000 | Kalkunte et al. ........... | 370/229 |
| 6,188,671 B1 | | 2/2001 | Chase et al. ................ | 370/232 |
| 6,308,209 B1 | | 10/2001 | Lecheler ..................... | 709/224 |
| 6,324,616 B1 | | 11/2001 | Chrysos et al. ............. | 710/244 |
| 6,970,425 B1 | * | 11/2005 | Bakshi ........................ | 370/235 |
| 2001/0012272 A1 | | 8/2001 | Aubert et al. ............... | 370/230 |
| 2001/0014928 A1 | | 8/2001 | Chrysos et al. ............. | 710/244 |
| 2002/0095498 A1 | * | 7/2002 | Chanda et al. .............. | 709/225 |

OTHER PUBLICATIONS

"Edge Closed User Groups", found at www.larscom.com/support/techlib/cug/cug.html, 1998.

* cited by examiner

*Primary Examiner*—Chau Nguyen
*Assistant Examiner*—Kerri M. Dyke
(74) *Attorney, Agent, or Firm*—Weingarten, Schurgin, Gagnebin & Lebovici LLP

(57) ABSTRACT

A ring network provides transparent local area network (LAN) service by allocating respective proportions of data transmission capacity of the ring to different closed user groups (CUGs), each including a plurality of LAN clients. At each node of the ring, the use of a connected segment of the ring is monitored for both pass-through and locally-generated traffic by the LAN clients on a per-CUG basis. When it is detected that use of the connected segment for a CUG is approaching the allocated proportion, an active LAN client of the CUG is selected and sent a throttle message indicating that the LAN client is to reduce its data transmission rate. Rate monitoring for is accomplished using a "leaky bucket" mechanism. A "rate cache" identifying the active senders and their transmission rates can also be used in selecting a LAN client for receiving the throttle message.

14 Claims, 3 Drawing Sheets

AGGREGATE RATE TRANSPARENT LAN SERVICE FOR CLOSED USER GROUPS OVER OPTICAL RINGS

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of data communications networks, and more particularly to networks providing transparent local area network (LAN) service.

Wide-area data communications networks or WANs can be used to provide so-called "transparent LAN service" among devices attached to geographically separated LAN segments. Transparent LAN service effectively hides the underlying WAN network from the devices, and thus enables the devices to communicate using only their native LAN protocol. Transparent LAN service can provide several important benefits such as backwards compatibility while providing fast connection speeds and lower operating costs. Newer WAN networking equipment can successfully interoperate with devices having only LAN interfaces, and customer investments in LAN equipment can be protected, easing customer acceptance of newer networking technology.

Transparent LAN service has been provided for different types of LANs in different types of WANs. Ethernet is one of the predominant LAN technologies, and therefore is widely supported in various implementations of transparent LAN service. Transparent LAN service has been provided in circuit-based WANs such as ATM and frame relay networks.

In a connection oriented WAN such as a frame relay network, transparent LAN service requires potentially numerous point-to-point connections among LAN clients on different LAN segments attached to the frame relay network. The required connectivity can be expensive and difficult to configure and maintain. In particular, it can be cumbersome to accurately specify the respective rates at which data is expected to be transferred between each of many source/destination pairs, a function that is required in the provisioning of frame relay and other data circuits. It would be desirable for transparent LAN services to be provided in a simpler manner so as to reduce the costs and complexity involved in configuring and otherwise managing enterprise networks that rely on transparent LAN services

BRIEF SUMMARY OF THE INVENTION

In accordance with the present invention, apparatus and methods are disclosed for providing transparent LAN service in an optical ring network that reduces the configuration burden on a customer, specifically the burden of specifying data rates for a potentially large number of LAN source/destination pairs.

Respective proportions of data transmission capacity of the optical ring are allocated to different closed user groups (CUGs), each CUG including a number of users or clients of the transparent LAN service. For a given CUG, the allocated proportion is referred to as an "aggregate rate" of transmission capacity to which the CUG as a whole is entitled. The aggregate rate for a CUG reflects an expected overall traffic demand. For example, if a CUG includes ten sources each expected to generate 100 Kb/s traffic on average, a reasonable aggregate rate specification for the CUG might be 1000 Kb/s. There is no need to further specify data rates among the individual members of the CUG nor to implement point to point connectivity.

At each node of the ring, the use of a connected segment of the ring is monitored for both pass-through and locally-generated traffic of the CUG users on a per-CUG basis. When it is detected that use of the connected segment for a given CUG is approaching the proportion of ring data transmission capacity allocated to the CUG, an active one of the users of the CUG is sent a throttle message indicating that the user is to reduce its data transmission rate. This has the effect of limiting the CUG to its specified aggregate rate, without requiring any specification or monitoring of individual data rates among users of the CUG.

A "leaky bucket" flow control mechanism employing CUG-specific buffers and thresholds can be utilized to monitor compliance with a specified aggregate rate. Different types of throttle mechanisms can also be employed. Other aspects, features, and advantages of the present invention will also be apparent from the detailed description that follows.

BRIEF DESCRIPTION OF THE SEVERAL VIEWS OF THE DRAWING

The invention will be more fully understood by reference to the following Detailed Description of the invention in conjunction with the Drawing, of which.

DETAILED DESCRIPTION OF THE INVENTION

Figure 1:
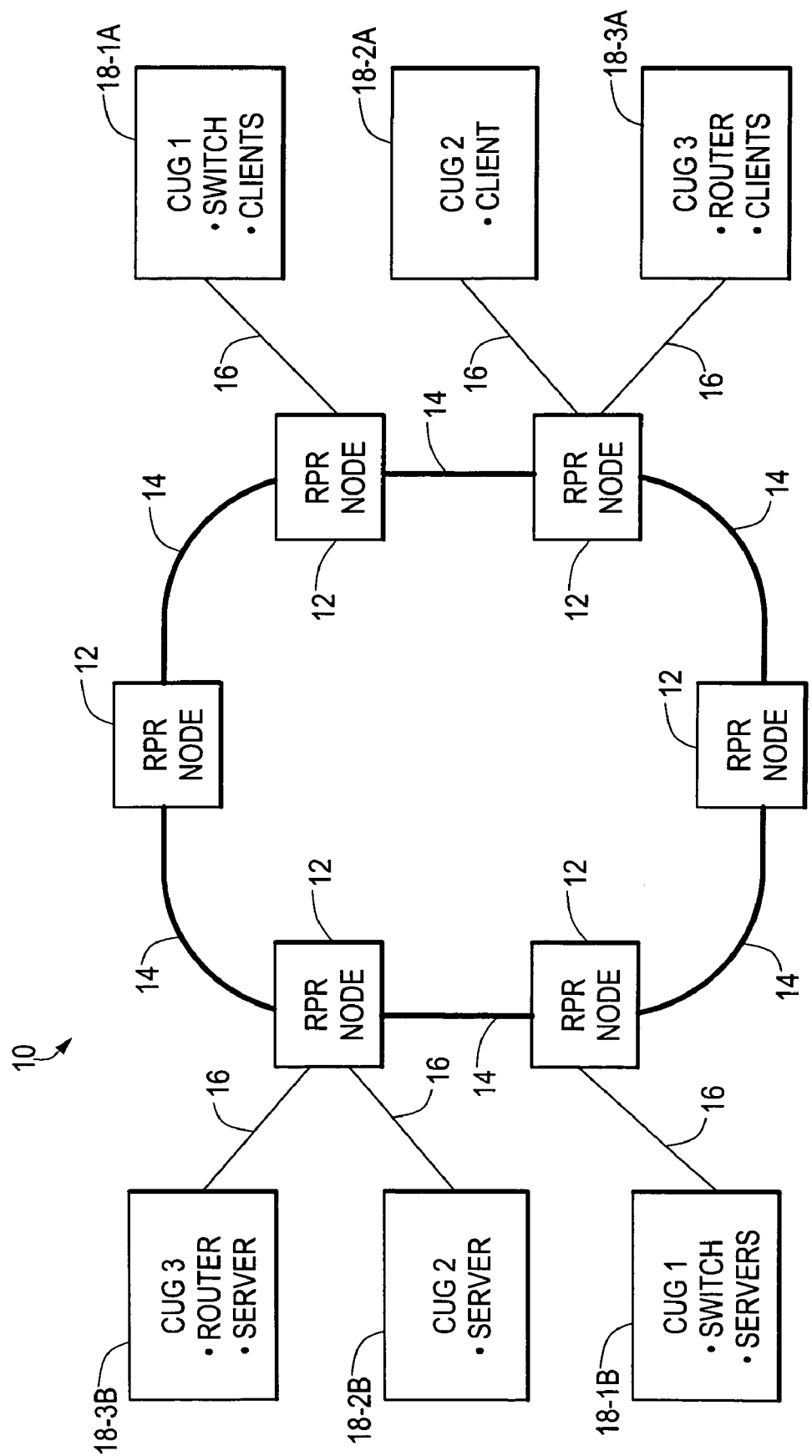
FIG. 1 is a block diagram of a network in which aggregate rate transparent LAN services are provided in accordance with the present invention.

In FIG. 1, a resilient packet ring (RPR) optical network 10 includes a plurality of RPR nodes 12 interconnected by optical fiber ring segments 14. Various of the RPR nodes 12 are connected to customer links 16 via which customer traffic to be carried through the network 10 is provided. The links 16 are connected to different ports of these RPR nodes 12. The traffic and associated equipment of different customers are identified as belonging to different closed user groups (CUGs), which in the simplified network of FIG. 1 are shown as CUG 1, CUG 2, and CUG 3. CUG 1 includes a first collection 18-1A that includes a switch and one or more client machines, for example, and a second collection 18-1B that includes a switch and one or more server machines. Similarly, CUG 2 includes first and second collections 18-2A and 18-2B which respectively include a client machine and a server machine. CUG 3 includes a first collection 18-3A which includes a router and one or more client machines, and a second collection 18-3B that includes a router and one or more server machines. For purposes of this description, the various machines within the CUGs 18 are also referred to as "LAN clients".

The RPR network 10 carries traffic among different collections of a given CUG in a "transparent" fashion, meaning that (1) each CUG 18 (such as CUG 18-1) operates independently of the other CUGs 18 (such as CUGs 18-2 and 18-3) in the network, and (2) each collection (such as collection 18-1A) communicates with each counterpart collection of the same CUG (such as collection 18-1B) as though the network 10 were not interposed between them. The RPR nodes 12 employ packet encapsulation and decapsulation techniques to carry customer packets through the network 10 while associating each encapsulated packet with a particular CUG 18.

In addition to providing for logical separation of the traffic from different CUGs 18, the RPR nodes 12 provide other services on a per-CUG basis. In particular, the RPR nodes 12 perform functions pertaining to CUG-specific service level agreements (SLAs) that specify the nature of CUG traffic and the type of service to be provided by the network 10. While SLAs may pertain to a variety of different aspects of network service, the present description focuses on one particular aspect, which is the data communications bandwidth required by a CUG. As described below, the RPR nodes 12 incorporate functionality to monitor the use of network bandwidth by members of each CUG 18 and to selectively take steps to control the use of network bandwidth so as to ensure compliance with SLAs. This aspect of operation is referred to below as the enforcement of an agreed "aggregate rate" among the users of a CUG. In addition to providing aggregate rate services, the RPR nodes 12 can also provide so-called "best effort" services for which there is no guaranteed aggregate rate. Best effort services are also described in additional detail below.

As previously mentioned, in prior data communications networks such as frame relay networks, it is necessary to specify bandwidth requirements on a per-circuit basis. For CUGs having more than a few source-destination pairs, the process of accurately specifying bandwidth requirements in this fashion can be unwieldy. Typically, the end user is charged on a bandwidth and per circuit basis, and a user enterprise pays for bandwidth whether used or not. Further, bandwidth between one set of locations cannot be easily used between another set of locations as instantaneous bandwidth demands change, even though the user enterprise may have available and paid for bandwidth in the network. Therefore, the network 10 employs the concept of a per-CUG "aggregate rate", or a total amount of transmission bandwidth available to all the users of a CUG 18. From the perspective of the users of a given CUG 18, the network 10 appears as a shared transmission medium having a total transmission capacity equal to the aggregate rate specified for the CUG. This transmission capacity is shared among the users of the CUG in a dynamic fashion, as described in more detail below. Further, the total transmission capacity of the network 10 can be shared among multiple CUGs by appropriate specification of respective aggregate rates for the CUGs.

Generally, the aggregate rate specification for a CUG applies to the sum of the traffic rates into the network 10 from all CUG sources. Thus, for example, a 1 Mb/s aggregate rate specification would support a CUG having ten 100 Kb/s sources, or a CUG having two 400 Kb/s sources and ten 20 Kb/s sources. It should be noted that the ring network 10 employs "destination stripping", so that messages in general do not traverse the entire ring. This operational property is referred to as "spatial reuse".

Because of the spatial reuse property, for a given CUG with its specified aggregate rate, the utilization of the various segments 14 around the network 10 depends on the physical locations of the CUG sources and destinations. Segments 14 that are near high-rate sources or destinations generally carry higher levels of CUG traffic than segments 14 that are further away from such sources/destinations. It will be appreciated that this non-uniform distribution of traffic around the ring 10 arises from the spatial reuse property of the ring 10. However, the aggregate rate specification, per se, takes no account of the distribution of the traffic around the ring 10. In this respect, the aggregate rate specification can be viewed as defining a CUG-specific logical ring on the physical ring 10 having transmission capacity equal to the specified aggregate rate.

Figure 2:
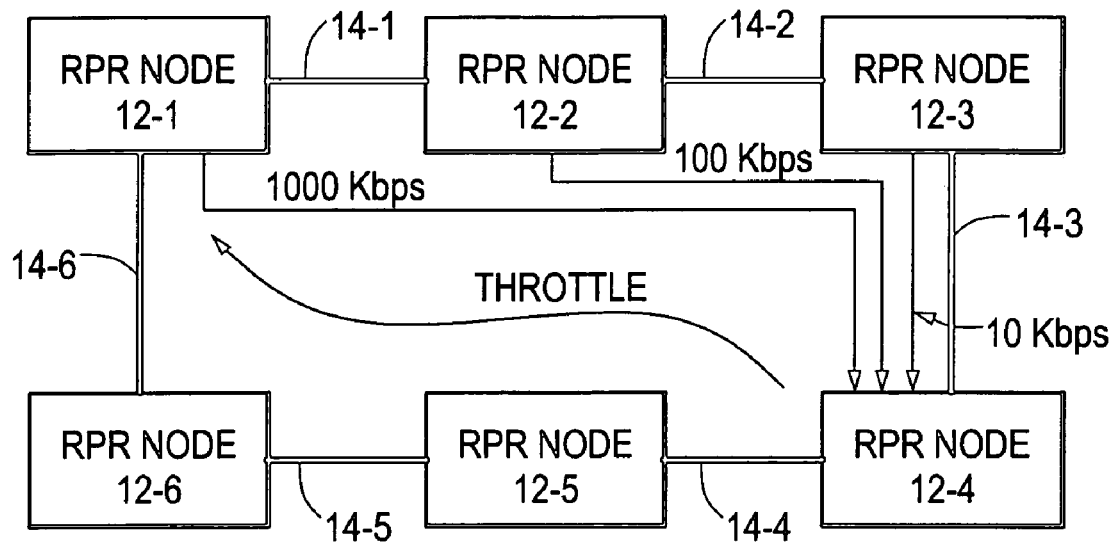
FIG. 2 is a block diagram of a resilient packet ring (RPR) optical network in the network of FIG. 1 showing an exemplary traffic pattern and the sending of a throttle message to an active sender.

FIG. 2 shows an example of the disclosed rate detection and throttling mechanism. It is assumed that members of the same CUG attached to RPR nodes 12-1, 12-2 and 12-3 are transmitting at respective rates of 1000 Kbps, 100 Kbps, and 10 Kbps, and that these streams are received by RPR node 12-4 for transmission onto segment 14-4. It is further assumed that the agreed aggregate rate for this CUG is less than the cumulative 1110 Kbps rate of these streams. In this case, the node 12-4 has selected a CUG user attached to node 12-1 (not shown in FIG. 2) to be the recipient of a throttle message. Upon receipt of the message, the user temporarily slows or suspends its transmission in accordance with a predefined method or specified rate, resulting in a reduction in the rate of traffic reaching node 12-4. If the reduction is sufficient, no more throttle messages are necessary. If time passes without a sufficient reduction in the aggregate rate passing through node 12-4, then the node 12-4 can issue another throttle message to the same or a different CUG user.

Figure 3:
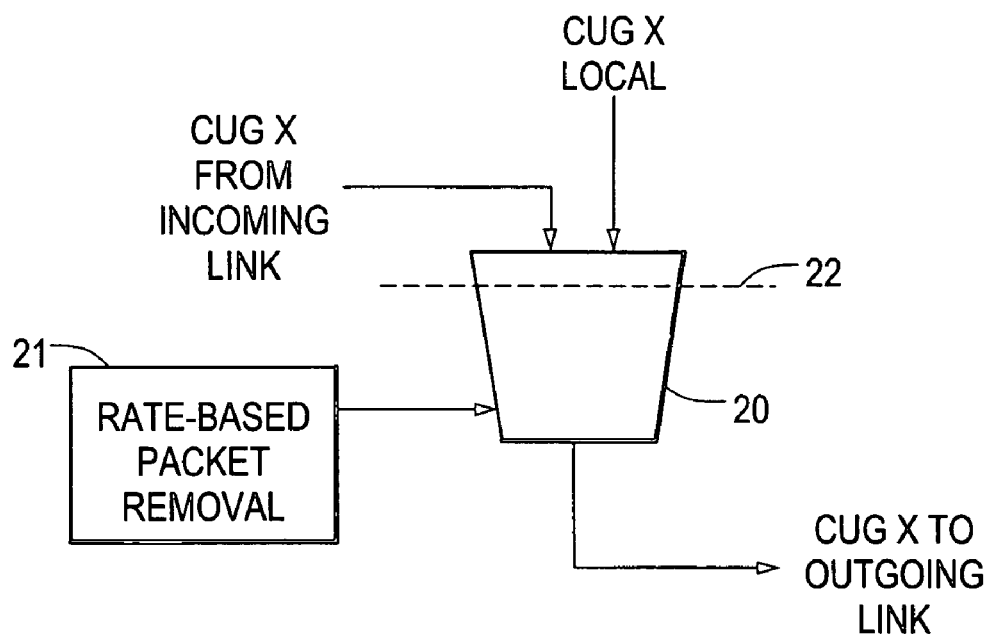
FIG. 3 is a diagram depicting a leaky bucket flow control mechanism used to monitor network traffic at a node in the RPR network of FIG. 2.

FIG. 3 shows a "leaky bucket" mechanism used at each node 12 for monitoring and controlling the use of an outgoing ring segment 14 by users of a given CUG 18. The leaky bucket mechanism is replicated for each CUG 18 for which a given node 12 carries traffic. The leaky bucket mechanism includes a set of packet buffers 20 that receive packets from both "local" CUG users (i.e., users attached to this RPR node 12) as well as from other users of the CUG via an incoming link 14, and provides packets for this CUG to an outgoing link 14. It will be understood that separate de-multiplexing logic (not shown) is used to separate the traffic of this CUG from that of other CUGs also received from the incoming segment 14, and separate multiplexing logic (not shown) is used to merge the traffic of this CUG with that of other CUGs also being transmitted on the outgoing segment 14.

Packets are removed from the buffers 20 at the predetermined aggregate rate by rate-based packet removal logic 21. This can be done in any of a variety of known ways. As long as the occupancy of the buffers 20 is less than a predetermined maximum threshold 22, it is inferred that the aggregate rate is not being exceeded. It is important that the size of the buffers 20 and the setting of the threshold 22 be chosen to accommodate the expected burstiness of the traffic. A given CUG may comply with the aggregate rate as an average over an extended period of time, but may tend to utilize the bandwidth in bursts each having significantly higher instantaneous bandwidth. Such dynamic CUG behavior should be factored into the design of the buffers 20 and threshold 22.

When the threshold 22 is exceeded, the RPR node 12 sends a "throttle" message to a selected CUG member indicating that the CUG member should reduce its rate of transmission into the network 10, as described above with reference to FIG. 2. This is the "enforcement" aspect of the aggregate rate service agreement. Different types of throttle mechanisms may be used. For example, a "pause" message may be used that indicates that the CUG member is to cease transmission for a specified period, following which it is permitted to resume transmission. Alternatively, the throttle message may indicate that the instantaneous transmission rate of the CUG member should be reduced by some absolute or relative amount. This may be followed by gradual growth in the transmission rate, or by resumption of the higher rate after a specified period of transmitting at the lower rate, either of these being subject to additional throttle messages in the future. Generally, the throttle mechanism should enable each RPR node 12 to effectively enforce compliance with the aggregate rate on its outgoing links 14.

In order to choose a CUG member to be throttled when the threshold 22 is exceeded, an RPR node 12 preferably maintains a per-CUG "rate cache" identifying the most active sources within the CUG. The rate cache should include the instantaneous transmission rates of the most active sources, for example by using the following structure:

| Sender | Rate |
|---|---|
| A | 1000 |
| ... | ... |
| B | 100 |
| ... | ... |
| C | 10 |

When an RPR node 12 determines that the threshold 22 for a given CUG is exceeded, it consults the rate cache of the CUG to identify a sender to be throttled, and issues a throttle message to this sender. Different algorithms for choosing a sender can be employed. Rotation among different active senders is preferable, so as to ensure some degree of fairness. For instance, the throttle message can be sent to some predetermined number or proportion of the most active users.

As previously mentioned, the aggregate rate guarantee can be viewed as analogous to the service provided by a shared transmission medium such as Ethernet. To this end, transmission capacity on each segment 14 is reserved or allocated on a per-CUG basis, and the amount reserved on each segment 14 is equal to the specified aggregate rate for the CUG. If the combined rate of streams from any set of sources within a CUG exceeds the specified aggregate rate on any segment 14, then the throttling mechanism is invoked. Thus, the CUG is prevented from using more than the specified aggregate rate at any given point on the ring.

It should be noted that the aggregate rate as monitored and enforced by the disclosed method is not necessarily equal to the "sum from all sources" specification of the aggregate rate as may be reflected in an SLA. If the sources for a given CUG are clustered near one segment 14, then these two specifications may be quite close to each other or identical. This is because most or all of the traffic from all CUG sources can be found on the one segment 14, so measuring the rate on the segment 14 is equivalent to measuring each source separately and adding the results. However, if the sources are distributed around the ring 10, the measurement yielded by the disclosed method tends to diverge from the sum-of-sources aggregate rate. In general, the more the sources and destinations are distributed around the ring, the more the sum-of-sources rate may exceed the aggregate measured at any particular segment 14 of the ring. Thus, the disclosed method does not necessarily detect all cases in which a specified aggregate rate is exceeded by the users of a CUG. However, the cases that are not detected do not conflict with the allocation of transmission resources around the ring 10 as a function of a specified aggregate rate. The aggregate rate is made available on each segment 14, regardless of the distribution of CUG sources and destinations. Even when the distribution results in providing more than the specified aggregate rate to the collection of sources in a CUG, the specified aggregate rate is not exceeded on any segment 14. In general, this aspect of operation is not problematic, compared for example to networks employing Ethernet over SONET, in which bandwidth is reserved on the entire ring for providing any-to-any connectivity. The disclosed method can provide similar connectivity while also allowing for improved utilization of available bandwidth, due to RPR properties like spatial reuse.

Figure 4:
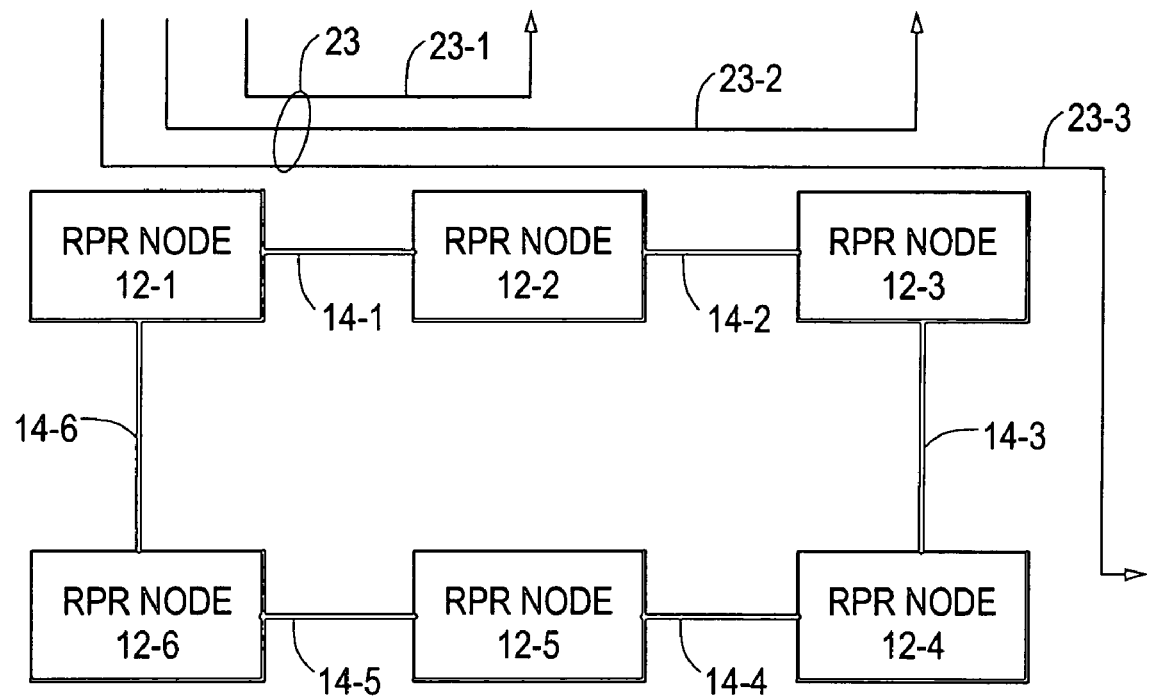
FIG. 4 is a block diagram of the RPR optical network of FIG. 2 with a second exemplary traffic pattern.
Figure 5:
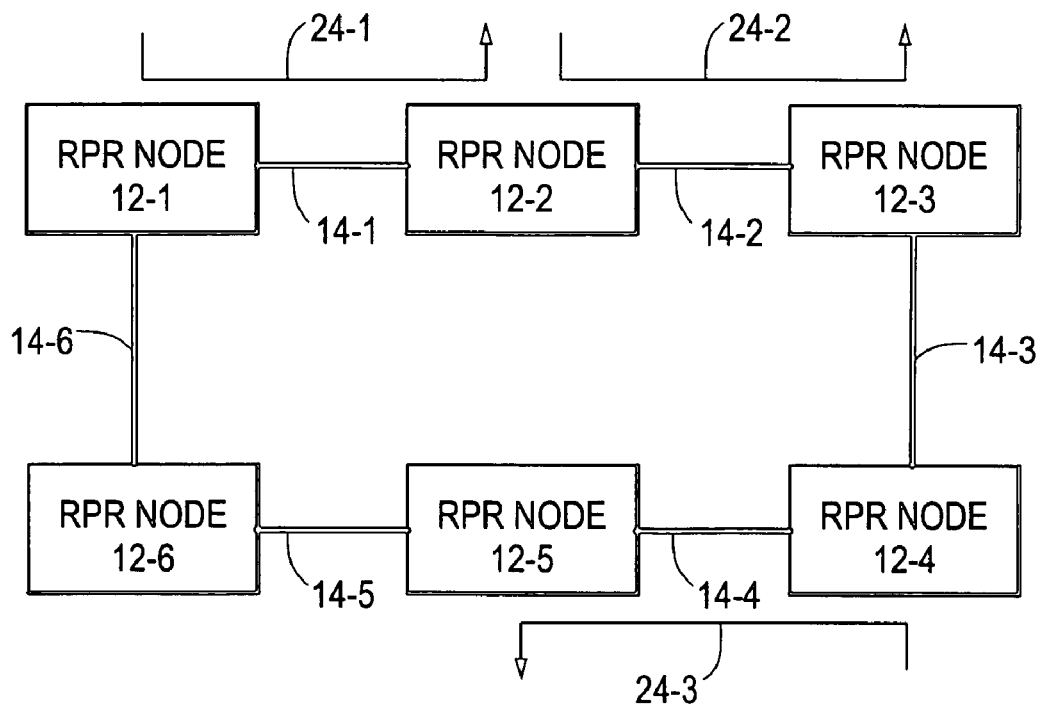
FIG. 5 is a block diagram of the RPR optical network of FIG. 2 with a third exemplary traffic pattern.

Examples are presented to illustrate this feature of the disclosed method. In FIG. 4, three traffic flows 23 emanate from respective sources (not shown) attached to RPR node 12-1. A first flow 23-1 has a destination attached to RPR node 12-2; a second flow 23-2 has a destination attached to RPR node 12-3; and a third flow 23-3 has a destination attached to RPR node 12-4. All three flows 23 are carried on segment 14-1, for example, and therefore contribute to the utilization of the segment 14-1. This situation can be contrasted with the situation of FIG. 5, in which sources and destinations are located such that three flows 24-1, 24-2 and 24-3 are carried on completely different segments 14. If it is assumed that each flow is of a unit bandwidth (e.g., 1 Mb/s), then the respective sum-of-sources aggregate rates for the arrangements of FIGS. 4 and 5 are equal (e.g., 3 Mb/s). However, the arrangement of FIG. 4 clearly results in significantly greater utilization of segments 14-1 and 14-2, due to the concentration of the sources at RPR node 12-1, and therefore detection and throttling will occur in this arrangement sooner than will occur in the arrangement of FIG. 5.

The RPR network 10 may provide different classes of service to different CUGs in accordance with a predetermined scheme. In particular, one or more "guaranteed delivery" service classes may be defined along with a "best effort" service class, for which delivery of messages is not guaranteed. In this case, it may be advantageous to employ the disclosed aggregate rate monitoring and enforcement method in the following manner. At each node 12, one leaky bucket mechanism may be used for each CUG receiving guaranteed service. The outputs of the various leaky bucket buffers 20 can be provided to a guaranteed service queue, from which packets are taken for transmission onto an outgoing segment 14 without any further rate-based processing. Additionally, a separate best effort queue is used for CUGs receiving best-effort service. Since no rate is guaranteed to such CUGs, no leaky bucket or other rate policing mechanisms are used on a per-CUG bases. However, it may be useful to employ the disclosed method on the best-effort queue as a whole. That is, the best effort queue itself can be structured as a leaky bucket, including a threshold 22 that triggers the sending of throttle messages to members of best-effort CUGs. This scheme is utilized to avoid congestion in the best-effort queue that might result in the discarding of messages. Accordingly, the scheme can be seen as enabling the provision of an improved best-effort service.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A method of providing transparent local area network (LAN) service in a ring network, comprising:
   allocating respective proportions of data transmission capacity of the ring to different closed user groups (CUGs), each closed user group including a corresponding plurality of LAN clients of the transparent LAN service; and
   at each of a plurality of network devices attached to the ring:
   (1) monitoring the use of a connected segment of the ring for both pass-through and locally-generated traffic by the LAN clients on a per-CUG basis; and
   (2) upon detecting that use of the connected segment for a given CUG is approaching the proportion of ring data transmission capacity allocated to the CUG, selecting an active one of the LAN clients of the CUG and sending a throttle message to the selected LAN client, the throttle message indicating that the LAN client is to reduce its data transmission rate.

2. A method according to claim 1, wherein the monitoring for each CUG comprises:
   maintaining a set of buffers for traffic of the CUG and removing traffic from the buffers at a predetermined aggregate rate corresponding to the proportion of ring data transmission capacity allocated to the CUG; and
   continually determining whether the occupancy of the buffers exceeds a predetermined threshold.

3. A method according to claim 1, wherein the selecting for each CUG comprises:
   maintaining a rate cache identifying active sending ones of the LAN clients of the CUG and corresponding rates at which the active LAN clients are sending traffic; and
   selecting from among the active LAN clients identified in the rate cache according to a predetermined selection criteria.

4. A method according to claim 3, wherein the predetermined selection criteria includes successively rotating among the identified active LAN clients.

5. A method according to claim 1, wherein the CUGs are first-type CUGs receiving guaranteed delivery service, and further comprising, at each of the plurality of network devices:
   monitoring the fullness of a set of buffers for traffic of second-type CUGs receiving best-effort service; and
   upon detecting that the fullness of the buffers exceeds a predetermined threshold, selecting an active one of the LAN clients of one of the second-type CUGs and sending a throttle message to the selected LAN client, the throttle message indicating that the LAN client is to reduce its data transmission rate.

6. A method according to claim 1, wherein the throttle message comprises a pause message, and wherein the selected LAN client responds to the pause message by temporarily ceasing its data transmission.

7. A method according to claim 1, wherein the throttle message indicating that the selected LAN client is to reduce its transmission rate by a predetermined amount specified by the throttle message.

8. A network providing transparent local area network (LAN) service, the network comprising a plurality of nodes interconnected in a ring, the ring having an overall data transmission capacity divided into respective proportions allocated to different closed user groups (CUGs), each closed user group including a corresponding plurality of LAN clients of the transparent LAN service, each of the nodes being operative to (1) monitor the use of a connected segment of the ring for both pass-through and locally-generated traffic by the LAN clients on a per-CUG basis, and (2) upon detecting that use of the connected segment for a given CUG is approaching the proportion of ring data transmission capacity allocated to the CUG, select an active one of the LAN clients of the CUG and sending a throttle message to the selected LAN client, the throttle message indicating that the LAN client is to reduce its data transmission rate.

9. A network according to claim 8, wherein each node includes a plurality of sets of buffers, each set used to buffer the traffic of a corresponding one of the CUGs, and is further operative when monitoring segment use for each CUG to: (1) remove traffic from the buffers of the CUG at a predetermined aggregate rate corresponding to the proportion of ring data transmission capacity allocated to the CUG, and (2) continually determine whether the occupancy of the buffers exceeds a predetermined threshold.

10. A network according to claim 8, wherein each node includes a plurality of rate caches, each rate cache identifying active sending ones of the LAN clients of a corresponding CUG and corresponding rates at which the active LAN clients are sending traffic, and wherein the node is operative when selecting a LAN client for receiving a throttle message to select from among the active LAN clients identified in the rate cache according to a predetermined selection criteria.

11. A network according to claim 10, wherein the predetermined selection criteria includes successively rotating among the identified active LAN clients.

12. A network according to claim 8, wherein the CUGs are first-type CUGs receiving guaranteed delivery service, and wherein each of the nodes is further operative to (1) monitor the fullness of a set of buffers for traffic of second-type CUGs receiving best-effort service, and (2) upon detecting that the fullness of the buffers exceeds a predetermined threshold, select an active one of the LAN clients of one of the second-type CUGs and send a throttle message to the selected LAN client, the throttle message indicating that the LAN client is to reduce its data transmission rate.

13. A network according to claim 8, wherein the throttle message comprises a pause message, and wherein the selected LAN client responds to the pause message by temporarily ceasing its data transmission.

14. A method according to claim 8, wherein the throttle message indicating that the selected LAN client is to reduce its transmission rate by a predetermined amount specified by the throttle message.

* * * * *